United States Patent
Ruble et al.

(10) Patent No.: US 9,612,822 B2
(45) Date of Patent: Apr. 4, 2017

(54) TELECOMMUNICATIONS NODE CONFIGURATION MANAGEMENT

(71) Applicant: Adtran, Inc., Huntsville, AL (US)

(72) Inventors: Andrew T. Ruble, Athens, AL (US); Byron L. Young, New Market, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 14/813,371

(22) Filed: Jul. 30, 2015

(65) Prior Publication Data

US 2017/0031672 A1 Feb. 2, 2017

(51) Int. Cl.
*G06F 9/44* (2006.01)
*G06F 9/445* (2006.01)
*H04L 29/08* (2006.01)
*H04L 12/751* (2013.01)

(52) U.S. Cl.
CPC .................. *G06F 8/65* (2013.01); *G06F 8/61* (2013.01); *H04L 45/02* (2013.01); *H04L 67/34* (2013.01)

(58) Field of Classification Search
None
See application file for complete search history.

(56) References Cited

U.S. PATENT DOCUMENTS

2015/0149989 A1* 5/2015 Lu .............................. G06F 8/65
717/170

* cited by examiner

Primary Examiner — Qamrun Nahar
(74) Attorney, Agent, or Firm — Fish & Richardson P.C.

(57) ABSTRACT

Methods, systems, and apparatus, including computer programs encoded on a computer storage medium, for managing device firmware. In one aspect, a system includes a file server; a subtending device coupled to the file server, and a telecommunications node coupled to the subtending device. The subtending device can include one or more line cards that connect one or more telecommunications nodes to a network. The telecommunications node receives, from the subtending device, a group name and replaces a wildcard in a firmware filename to derive a first network path of firmware files. The telecommunications node installs the firmware files and subsequently receives an updated group name. The telecommunications node replaces the wildcard with the updated group name to derive an updated path, and obtains different firmware files from the updated path. The firmware installed on the telecommunications node is managed based on the first firmware and the different firmware.

19 Claims, 5 Drawing Sheets

TELECOMMUNICATIONS NODE CONFIGURATION MANAGEMENT

BACKGROUND

This specification relates to telecommunications networks and configuration management of network nodes. Telecommunications nodes can be configured in many different ways, for example, based on services that are being provided to customers that are provided telecommunications service by the telecommunications nodes. For example, the telecommunications nodes can be configured to provide certain calling features or certain levels of data service. Over time the configuration of telecommunications nodes may change (e.g., due to added services). Additionally, many telecommunications nodes operate using firmware that can be updated periodically.

SUMMARY

In general, one innovative aspect of the subject matter described in this specification can be embodied in a telecommunications node that includes a transceiver that couples the telecommunications node to a line card of a subtending device that provides access to a carrier network; a memory device; and a data processor coupled to the transceiver and the memory device. The data processor can be configured to manage firmware installed at the telecommunications node by performing operations including receiving, from the subtending device, a group name for the telecommunications node; obtaining a firmware filename; replacing a wildcard in the firmware filename with the group name to derive a first network path of firmware files for the telecommunications nodes; installing first firmware files obtained from the first network path; receiving, from the subtending device, an updated group name for the telecommunications node; replacing the wildcard in the firmware filename with the updated group name to derive an updated network path of firmware files for the telecommunications node; obtaining second firmware files from the updated path; managing firmware installed on the telecommunications node based on the first firmware files and the second firmware files. Other embodiments of this aspect include corresponding methods, systems, apparatus, and computer programs, configured to perform the actions of the methods, encoded on computer storage devices.

These and other embodiments can each optionally include one or more of the following features. Managing firmware installed on the telecommunications node can include: comparing the second firmware files to the first firmware files; and taking an action based on the comparison.

Taking an action based on the comparison can include discarding the second firmware files when the second firmware files match the first firmware files. Taking an action based on the comparison can include replacing the first firmware files with the second firmware files when the second firmware files differ from the first firmware files.

The data processor can be configured to perform operations including receiving an auto-config filename of an auto-config file for the telecommunications node; replacing a wildcard value of the auto-config filename to derive a path of the auto-config file for the telecommunications node; obtaining the auto-config file from the derived path of the auto-config file; parsing the auto-config file to identify a definition filename for firmware definition files; and replacing a wildcard value in the definition filename with the group name to derive a network path of one or more firmware definition files. Obtaining the firmware filename can include obtaining the firmware filename from the firmware definition file obtained from the derived network path.

The data processor can be configured to perform operations including receiving, from the subtending device, a new group name that is included in a filename of an updated firmware version.

In general, another aspect of the subject matter described in this specification can be embodied in systems that include a file server; a subtending device coupled to the file server, wherein the subtending device includes one or more line cards that connect one or more telecommunications nodes to a network; and a telecommunications node coupled to the subtending device. The telecommunications node operates to manage firmware installed at the telecommunications node by performing operations including receiving, from the subtending device, a group name for the telecommunications node; obtaining a firmware filename; replacing a wildcard in the firmware filename with the group name to derive a first network path of firmware files for the telecommunications nodes; installing first firmware files obtained from the first network path; receiving, from the subtending device, an updated group name for the telecommunications node; replacing the wildcard in the firmware filename with the updated group name to derive an updated network path of firmware files for the telecommunications node; obtaining second firmware files from the updated path; managing firmware installed on the telecommunications node based on the first firmware files and the second firmware files. Other embodiments of this aspect include corresponding methods, apparatus, and computer programs, configured to perform the actions of the methods, encoded on computer storage devices.

These and other embodiments can each optionally include one or more of the following features. Managing firmware installed on the telecommunications node can include comparing the second firmware files to the first firmware files; and taking an action based on the comparison. Taking an action based on the comparison can include discarding the second firmware files when the second firmware files match the first firmware files. Taking an action based on the comparison can include replacing the first firmware files with the second firmware files when the second firmware files differ from the first firmware files.

The telecommunications node can be configured to perform operations including receiving an auto-config filename of an auto-config file for the telecommunications node; replacing a wildcard value of the auto-config filename to derive a path of the auto-config file for the telecommunications node; obtaining the auto-config file from the derived path of the auto-config file; parsing the auto-config file to identify a definition filename for firmware definition files; and replacing a wildcard value in the definition filename with the group name to derive a network path of one or more firmware definition files. Obtaining the firmware filename can include obtaining the firmware filename from the firmware definition file obtained from the derived network path.

The subtending device can be configured to perform operations including receiving, by the subtending device, a new group name that is included in a filename of an updated firmware version; and transmitting, by the subtending device, the new group name to the telecommunications node.

In general, another aspect of the subject matter described in this specification can be embodied in methods that include the actions of receiving, by a telecommunications node and from a subtending device, a group name for the telecommunications node; obtaining, by the telecommunications node, a firmware filename; replacing, by the telecommunications node, a wildcard in the firmware filename with the group name to derive a first network path of firmware files for the telecommunications nodes; installing, by the telecommunications node, first firmware files from the first network path; receiving, by the telecommunications node and from the subtending device, an updated group name for the telecommunications node; replacing, by the telecommunications node, the wildcard in the firmware filename with the updated group name to derive an updated network path of firmware files for the telecommunications node; obtaining, by the telecommunications node, second firmware files from the updated path; managing, by the telecommunications node, firmware installed on the telecommunications node based on the first firmware files and the second firmware files. Other embodiments of this aspect include corresponding systems, apparatus, and computer programs, configured to perform the actions of the methods, encoded on computer storage devices.

These and other embodiments can each optionally include one or more of the following features. Managing firmware installed on the telecommunications node can include comparing the second firmware files to the first firmware files; and taking an action based on the comparison.

Taking an action based on the comparison can include discarding the second firmware files when the second firmware files match the first firmware files. Taking an action based on the comparison can include replacing the first firmware files with the second firmware files when the second firmware files differ from the first firmware files.

Methods can include the actions of receiving, by a telecommunications node, an auto-config filename of an auto-config file for the telecommunications node; replacing, by the telecommunications node, a wildcard value of the auto-config filename to derive a path of the auto-config file for the telecommunications node; obtaining, by the telecommunications node, the auto-config file from the derived path of the auto-config file; parsing, by the telecommunications node, the auto-config file to identify a definition filename for firmware definition files; and replacing, by the telecommunications node, a wildcard value in the definition filename with the group name to derive a network path of one or more firmware definition files. Obtaining the firmware filename can include obtaining the firmware filename from the firmware definition file obtained from the derived network path.

Methods can include the actions of receiving, by the subtending device, a new group name that is included in a filename of an updated firmware version; and transmitting, by the subtending device, the new group name to the telecommunications node.

Methods can include the actions of obtaining, by the telecommunications node, updated firmware based on the new group name.

Particular embodiments of the subject matter described in this specification can be implemented so as to realize one or more of the following advantages. The configuration of a telecommunications node can be automated at installation of the telecommunications node using a multi-tiered configuration technique that utilizes filenames including wildcards (or other placeholders). The use of a multi-tiered configuration technique along with the use of filenames including wildcards results in a flexible configuration technique that enables many different types of telecommunications nodes to utilize the same initial configuration files (e.g., auto-config files) to subsequently obtain device-specific configuration files and firmware versions. For example, the techniques described below relate to including a same wildcarded configuration filename in an auto-config file that is provided to various different telecommunications nodes, and the various telecommunications nodes each replace the wildcard to derive a path of a device-specific configuration file that is used to configure the device. As such, a same device-agnostic auto-config file can be used to facilitate many different device specific configurations.

The multi-tiered configuration technique facilitates a more device-specific to less device-specific configuration process. For example, the auto-config file can instruct the telecommunications device to sequentially request multiple different configuration files until a configuration file is received in response to the request. In some implementations, the first configuration file requested is a most specialized configuration file (e.g., a temporary configuration file that exists for specific purposes and/or limited periods of time), the second configuration file requested is the device-specific (also referred to as unit-specific) configuration file that is uniquely maintained for that particular telecommunications device, and the third configuration file requested is a more general configuration file that can be applied to multiple different telecommunications devices when a more specialized configuration file is unavailable, thereby providing a fallback configuration file in the absence of a device-specific file is unavailable.

When the configuration of a telecommunications node is changed (e.g., at the device), the changes are automatically (e.g., without requiring human intervention) posted to the path of the device-specific configuration file so that the current configuration of the telecommunications node can be tracked and/or restored as needed. For example, if a given telecommunications node is replaced, the replacement node can utilize the techniques described in this document to configure itself in the same way as the previous telecommunications node.

Firmware versions of telecommunications nodes can be managed in an automated fashion using the techniques discussed in this document. For example, the firmware installed at each telecommunications node can be dependent upon a group name assigned to the telecommunications node. The telecommunications node replaces a wildcard in a firmware file name to derive the path of the firmware for that telecommunications node. As such, a firmware update can be initiated by simply changing the group name that is assigned to one or more nodes, and different groups of telecommunications nodes can be directed to different paths (e.g., network locations) based on their respective group names to obtain the appropriate firmware.

The techniques described in this document improve telecommunications technologies by ensuring that telecommunications devices are configured with the appropriate services to facilitate communication over a carrier network, even when those configurations may change over time. The techniques described in this document also reduce the number of different auto-config files that need to be maintained, thereby reducing the amount of data needed to be stored. The techniques described in this document also enable a device to self-discover the path of the files that are used to configure the device, resulting in a self-configuring telecommunications node.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
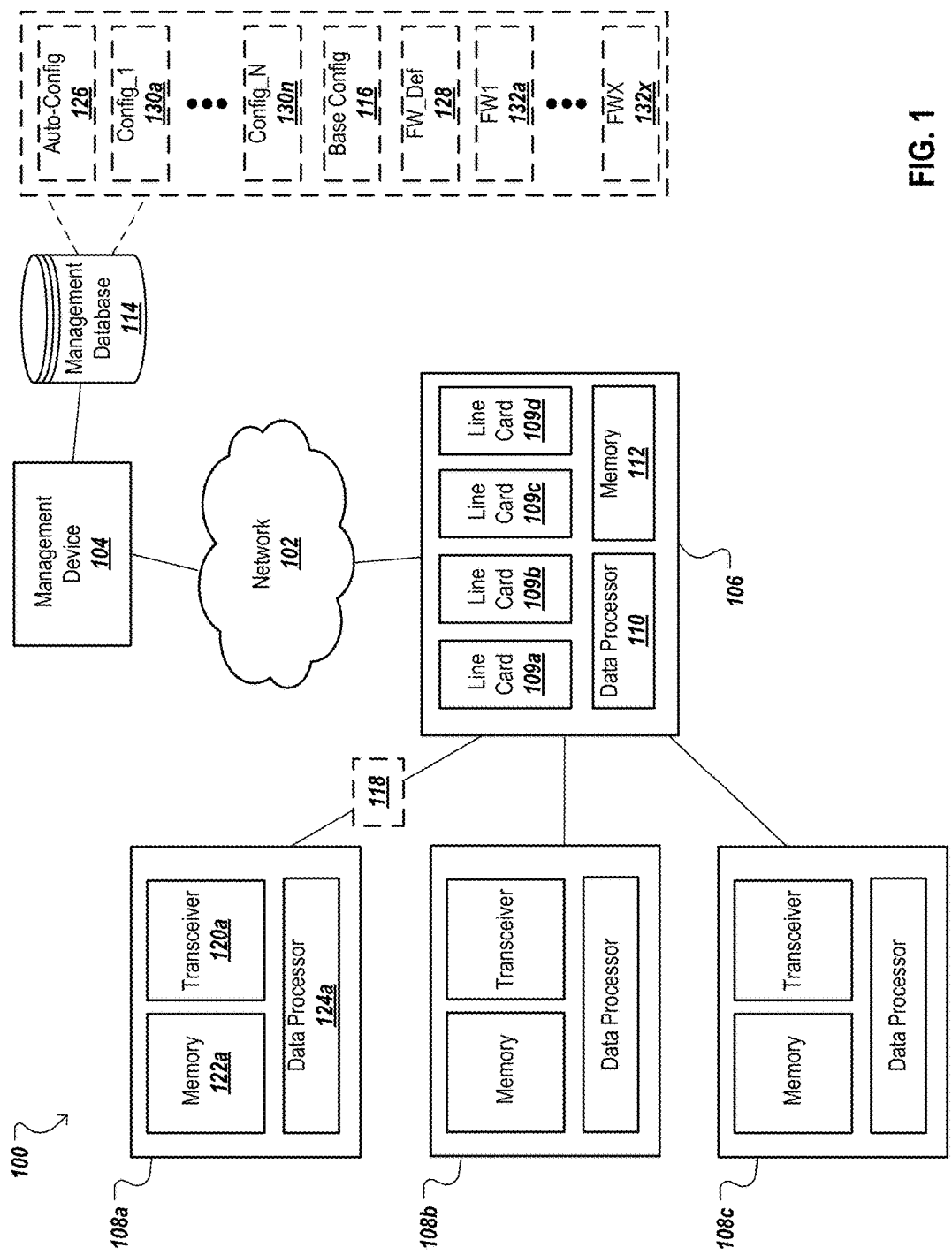
FIG. 1 is an example telecommunications environment in which telecommunications node configuration and/or firmware versions can be managed.

Automated methods and techniques of applying and maintaining the configuration and/or firmware for various telecommunications nodes are discussed throughout this document. As will be discussed in more detail with reference to the figures, a common (or same) auto-config file can be used to uniquely configure different telecommunications nodes. For example, wildcards (or other placeholders) included in one or more filenames of the auto-config file can be replaced, by each of the different telecommunications nodes, with a unique value (e.g., a device name or model number) to derive unique network paths corresponding to locations of configuration files and/or firmware files for the different telecommunications nodes. In the event that a file is not available from the unique network path for a given telecommunications node, the auto-config file includes fallback instructions that enable the given telecommunications node to obtain a base configuration file that provisions the given telecommunications node for operation.

Once a given telecommunications node has been configured, any subsequent changes to the configuration can be automatically included in an updated configuration file and posted to the unique network path of the configuration file for that given telecommunications node. If the given network node is subsequently replaced by a replacement network node, the replacement network node can derive the unique location of the updated configuration file using the auto-config file, and obtain the updated configuration file for purposes of automatically configuring the replacement network node (e.g., without human intervention). As such, a replacement telecommunications node can be automatically configured in the same way as the given network node was prior to replacement.

As will be discussed in detail below, firmware updates can also be managed using unique firmware network paths that are derived by replacing a wildcard in the firmware filename specified by the auto-config file. For example, each telecommunications node can be assigned a group name, and multiple telecommunications nodes that are to use the same firmware can be assigned a same group name. In this example, each telecommunications node can replace the wildcard in the firmware filename with the group name to derive the network path of the firmware that device is to download and install. When a network administrator wants to update the firmware for a group of telecommunications nodes, the network administrator can simply store the new firmware at a new unique location corresponding to a different group name, and update the group name of the telecommunications nodes in the group (e.g., by transmitting data specifying the new group name to the telecommunications nodes). The telecommunications nodes will use the new group name to automatically derive the new unique location, and obtain the new firmware from the new location.

The techniques discussed in this document are described with reference to telecommunications nodes (e.g., network termination equipment) operating in a telecommunications network environment. The techniques discussed in this document can also be used to configure other devices in other technological environments. As used throughout this document, a telecommunications node refers to a device that facilitates communication (e.g., a transfer of data) in a telecommunications environment. An example telecommunications node is a network terminating equipment (NTE). An NTE is a device that connects a customer premises to a carrier network. For example, an NTE can be a device that connects a customer network (e.g., 10baseT, 100baseT, or Gigabit Ethernet) to a carrier network (e.g., an optical network or xDSL bonded network). In some implementations, the NTE is connected to the carrier network by an access node, as described in more detail below.

FIG. 1 is an example telecommunications environment 100 ("environment") in which telecommunications node configuration and/or firmware versions can be managed. The telecommunications environment 100 includes a network 102, such as a local area network (LAN), a wide area network (WAN), the Internet, or a combination thereof. The network 102 connects various devices to facilitate exchange of data among those devices. As shown, the network 102 connects a management device 104 to an access node 106, and the access node 106 connects multiple telecommunications nodes 108a-108c to the network 102. Although only one management device 104 and one access node 106 are shown, the environment 100 can include many different management devices and/or access nodes 106.

The management device 104 is a data processing apparatus that provides monitoring and management of multiple different telecommunications nodes in the environment. For example, the management device 104 can monitor and generate reports related to various devices that are connected to the network, whether the various devices are operational, and usage levels of various devices. As discussed in more detail below, the management device 104 can also communicate with the various telecommunication nodes to distribute configuration files and firmware files to the various telecommunication nodes. The management device 104 can also store updated configuration files that are received from the various telecommunications nodes.

The configuration files and firmware files can be stored, for example, in a management database 114. The management database 114 is a data storage device that stores files used by the management device 104 to facilitate management of the network. In some implementations, the management database 114 stores different configuration files (e.g., Config_1 130a-Config_N 130n) that are provided to the different telecommunications nodes during configuration of the telecommunications nodes. The management database 114 can also store an auto-config file 126 that is used to identify various files that are to be used in configuring the telecommunications nodes. The auto-config file 126 includes Command Line Interface ("CLI") commands (or other commands) that instruct the telecommunications node to obtain additional configuration files and/or firmware files from one or more network paths, as discussed in more detail below.

The management database 114 can store a base configuration file 116 that contains CLI commands defining a common subset of configuration settings for multiple telecommunications nodes (e.g., TACACS+). The management database 114 can also store a unit-specific configuration file for each telecommunications node (e.g., Config1-ConfigN). Each unit-specific configuration file includes the complete service provisioning for a telecommunications node that is in normal operation mode once services have been applied to the telecommunications node. The management database 114 can further store, for any number of the telecommunications nodes, a temporary configuration file. The temporary configuration file for a given telecommunications node is a configuration file that is stored for troubleshooting purposes. Generally, the temporary configuration file will only be stored temporarily (e.g., for a specified period of time) in order to facilitate troubleshooting operations, and will expire after a specified period of time.

The access node 106 connects multiple different telecommunications nodes 108 to the network 102. For example, the access node 106 can include multiple line cards 109a-109d, which each have multiple ports that connect multiple telecommunications nodes (e.g., 108a-108c) to the network 102. Each line card can include a network side interface (e.g., an optical or electrical interface) used to transmit/receive data over the network 102. Each line card can also include a client side interface (e.g., an optical or electrical interface) used to transmit/receive data to/from the telecommunications nodes 108a-108c.

The access node 106 can also include a data processor 110 and memory 112 that enables the access node 106 to process instructions and take actions based on the execution of the instructions. For example, when a given telecommunications node (e.g., 108a) is first connected to a port of a line card (e.g., line card 109a), the access node 106 will generate data packets that include provisioning data 118 to the given telecommunications node. The provisioning data 118 can include information such as a system name, a location, one or more Internet Protocol ("IP") addresses (e.g., IPv6 and/or IPv4), a network location (e.g., IP address) of the auto-config file server (e.g., management device 104), a filename for the auto-config file, and a group name for the telecommunications node.

The telecommunications node 108a, which includes a transceiver, 120a, memory device 122a, and data processor 124a, parses (or otherwise processes) the provisioning data 118 to identify the location of the auto-config file server (e.g., the management device 104) and the filename for the auto-config file. In some implementations, the filename of the auto-config file provided to the telecommunications node 108a will include a wildcard (or another placeholder) that is used to derive the network path of the auto-config file.

For example, assume that the filename for the auto-config file 126 is "$part_number$/auto-config." In this filename, the string "$part_number$" is a wildcard that can be replaced with the model number (or some other identifier) of the telecommunications node 108a to derive the network path from which the appropriate auto-config file can be retrieved. For purposes of example, assume that the model number of the telecommunications node 108a is 12345. In this example, the telecommunications node 108a can replace the wildcard "$part_number$" with 12345 to obtain the filename of the path of the auto-config file (e.g., Auto-Config 126) that will be retrieved by the telecommunications node 108a. As such, different auto-config file paths can be derived for different models of telecommunications nodes.

In some implementations, the telecommunications node 108a requests the auto-config file from the management device 104 using Trivial File Transfer Protocol (TFTP), but other protocols can be used. In some implementations, communications between the telecommunications node 108a and the management device 104 that occur following retrieval of the auto-config file are performed using Secure Shell File Transfer Protocol (SFTP).

The auto-config file 126 includes filenames of various configuration files including one or more configuration files for the telecommunications node 108a and a filename for a firmware definition file 128. The firmware definition file 128 is a file including instructions that inform the telecommunications node 108a of the filename for firmware files that are to be installed on the telecommunications node 108a. In some implementations, the firmware definition file 128 can include a wildcard that is used to derive the network path of the firmware files that are to be installed on the telecommunications node 108a.

For example, assume that the filename for the firmware definition file 128 is specified in the auto-config file 126 as "definition_files/$group_name$," and that the string "$group_name$" designates a wildcard that is to be replaced with the group name assigned to the telecommunications node 108a. Further assume that the provisioning information 118 specifies that the group name for the telecommunications node 108a is "default." In this example, when the telecommunications node 108a is first installed, the telecommunications node 108a can replace the wildcard "$group_name$" with the group name "default" to derive the location of the firmware definition file as "definition_files/default." In turn, the telecommunications node 108a can use the derived location of the firmware definition file 128 to request the firmware definition file 128 from the management device 104.

When the telecommunications node 108a receives the firmware definition file 128, the telecommunications node 108a can parse the content of the firmware definition file to obtain the filenames of the firmware files that are to be installed (e.g., FW1 132a-FWX 132x). For example, the firmware definition file 128 may specify the filename "system_releases/$part_number$_App_H02_02.bin" as the filename of a firmware file for the telecommunications node 108a. In this example, the string "$part_number$" is a wildcard that can be replaced with the model number (or another identifier) of the telecommunications node 108a to derive the location of the firmware files. For example, the telecommunications node 108a can replace the wildcard "$part_number$" with "12345" to obtain the firmware path "system_releases/12345_App_H02_02.bin." The telecommunications node 108a can then use this derived path to obtain the firmware file from the management device 104.

The auto-config file 126 also includes multiple configuration filenames that can be used to configure the telecommunications node 108a. For example, the auto-config file 126 can include the filename "$part_number$/temporary/$system_name$.sca" for a temporary configuration file. The auto-config file 126 can also include the filename "$part_number$/$system_name$.sca" for a unit-specific configuration file. The auto-config file 126 can further specify the filename of the base configuration file 116 as "$part_number$/base-config." In each of these filenames, the telecommunications node 108a can replace the wildcard "$part_number$" with the model number (e.g., "12345") of the telecommunications node 108a. The telecommunications node 108a can also replace the wildcard "$system_name$" with the name assigned to the telecommunications node 108a by the provisioning data 118. The system name is a unique identifier for that particular telecommunications node 108a. Each different telecommunications node can have a different system name so that configuration files can be separately maintained for each of the telecommunications nodes. For purposes of example, assume that the system name for the telecommunications node 108a is "abcd."

In some implementations, the auto-config file 126 instructs the telecommunications node 108a to first attempt to obtain the temporary configuration file using the derived path of the temporary configuration file (e.g., "12345/temporary/abcd.sca"). If the telecommunications node 108a is unable to obtain the temporary configuration file (e.g., it does not exist), the auto-config file then instructs the telecommunications node 108a to attempt to obtain the unit-specific configuration file (e.g., Config_1) using the derived path of the unit-specific configuration file (e.g., "12345/abcd.sca"). If the telecommunications node 108a is unable to obtain the unit-specific configuration file (e.g., it does not exist), the auto-config file then instructs the telecommunications node 108a to obtain the base configuration file 116. Using this iterative process, the configuration of the telecommunications node 108a can be performed using the most specific (or specialized) configuration file that is available for the telecommunications node 108a. Additionally, this iterative process ensures that the telecommunications node 108a will be configured using the base configuration file 116 in the event that unit-specific or temporary configuration files have not been stored on the management device 104 for the telecommunications node 108a.

Once the telecommunications node 108a has installed the retrieved firmware and configuration files, the telecommunications node 108a can track any configuration changes and post an updated configuration file to the management device 104. As discussed in more detail below, the updated configuration file can then be used to configure a replacement telecommunications node that is installed in place of the telecommunications node 108a. Additionally, as discussed below, the management device 104 can assign a new group name to the telecommunications node 108a when a new version of firmware is to be installed at the telecommunications node 108a. The telecommunications node 108a will use this new group name to derive a location of the new firmware files and use the new firmware files to update the firmware of the telecommunications node.

Figure 2:
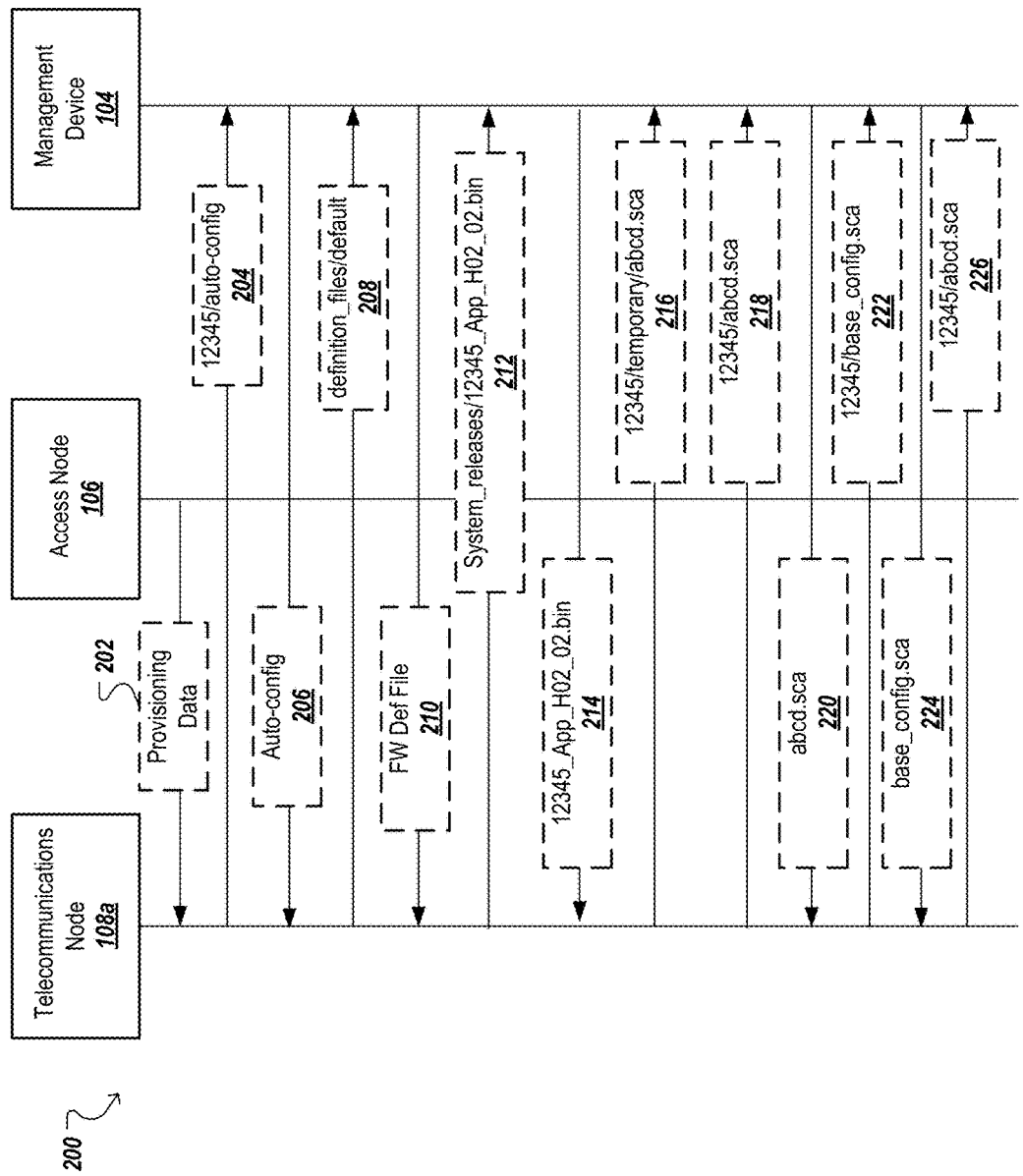
FIG. 2 is a block diagram of an example data flow for configuring a telecommunications node.

FIG. 2 is a block diagram of an example data flow 200 for configuring a telecommunications node 108a. The data flow 200 begins with the access node 106 transmitting provisioning data 202 to the telecommunications node 108a. In some implementations, the access node detects when the telecommunications node 108a is connected to a port of the access node 106. The provisioning data 202 provided by the access node 106 can include a static IP address that has been assigned to the port to which the telecommunications node 108a has been connected and a group name for the telecommunications node 108a. The provisioning data 202 can also include other information, such as the filename for the auto-config file that will be used to configure the telecommunications node 108a.

As discussed above, the filename for the auto-config file can include a wildcard value that can be replaced by the telecommunications node 108a to derive the location (e.g., network path) of the auto-config file that will be used by the telecommunications node 108a. For example, upon receiving the provisioning data 202, the telecommunications node 108a can parse the provisioning data to identify the filename for the auto-config file, which can take the form of "$part_number$/auto-config." As discussed above, the telecommunications node 108a replaces the wildcard with the model number of the telecommunications node 108a to derive the network path of the auto-config file "12345/auto-config." The telecommunications node 108a then submits a request 204 to the management device 104. The request 204 will identify the derived path of the auto-config file (e.g., "12345/auto-config"), such that the management device 104 can use the derived path to obtain the auto-config file for the telecommunications node 108a.

In response to the request 204, the management device transmits the auto-config file 206 to the telecommunications node 108a. In some implementations, the auto-config file includes machine executable code that instructs the telecommunications node 108a to request a firmware definition file from the management device 104 (or another device). In some implementations, the filename of the firmware definition file specified by the auto-config file includes a wildcard that can be replaced by the telecommunications node 108a to derive the location (e.g., network path) of the firmware definition file for the telecommunications node 108a. For example, the telecommunications node 108a can replace the wildcard in the firmware definition filename with the group name that was assigned to the telecommunications node 108a (e.g., as specified in the provisioning data). In turn, the telecommunications node 108a can submit a request 208 for the firmware definition file to the management device 104. The request 208 can include the derived location of the firmware definition file (e.g., "definition_files/default").

The management device 104 uses the request 208 to locate the requested firmware definition file and provide the firmware definition file 210 ("FW Def File") to the telecommunications node 108a. The telecommunications node 108a parses the firmware definition file 210 to identify the filename(s) of firmware file(s) that will be loaded onto the telecommunications node 108a. In some implementations, the firmware filename(s) can include a wildcard that can be replaced by the telecommunications node 108a to derive the location of the firmware for the telecommunications node 108a. For example, the telecommunications node 108a can replace a wildcard with the model number (e.g., "12345") of the telecommunications node 108a to derive the location of the firmware. In turn, the telecommunications node 108a can submit a request 212 for the firmware to the management device 104. The request 212 can include the derived location of the firmware for the telecommunications node 108a (e.g., "System_releases/12345_App_H02_02.bin"). In response to the request 212, the management device 104 can identify the requested firmware file 214, and provide the firmware file 214 to the telecommunications node 108a, which can take action based on the contents of the firmware file 214. For example, as discussed in more detail below with reference to FIG. 5, the telecommunications node 108a can store the firmware into cache if the received firmware differs from the currently installed firmware. However, if the firmware is the same as that already installed, the telecommunications node 108a can discard the received firmware file 214.

The auto-config file 206 also includes multiple different filenames for different types of configuration files. For example, as discussed above, the auto-config file 206 can include different filenames for each of a temporary configuration file, a unit-specific configuration file, and a base configuration file. Each of the filenames can include one or more wildcards that can be replaced with device specific information to derive the location of the configuration files for the telecommunications node 108a. For example, as discussed above, in some implementations, the filenames for the temporary and unit-specific configuration files may each include a part number wildcard (e.g., "$part_number$") and a system name wildcard (e.g., "$system_name$"). Meanwhile, the filename for the base configuration file may include only the part number wildcard.

The auto-config file 206 can instruct the telecommunications node 108a to sequentially request different configuration files until the management device 104 provides a configuration file in response to a request. In some implementations, the auto-config file 206 instructs the telecommunications node 108a to first request the temporary configuration file using the derived path of the temporary configuration file of the telecommunications node. For example, the telecommunications node 108a can submit the request 216 for the temporary configuration file. As shown, the request 216 includes the derived path of the temporary configuration file (e.g., "12345/temporary/abcd.sca"). In this example, the string "12345" replaced the part number wildcard, and the string abcd replaced the system name wildcard. If the telecommunications node 108a receives the temporary configuration file in response to the request 216, the telecommunications node 108a will use the temporary configuration file, and no further configuration file requests need to be sent to the management device 104.

If the telecommunications node 108a does not receive the temporary configuration file in response to the request 216 (e.g., because the file does not exist on the management device 104), the auto-config file 206 causes the telecommunications node 108a to submit a request 218 for the unit-specific configuration file. The request 218 includes the derived path of the unit-specific configuration file (e.g., "12345/abcd.sca"). In this example, the string "12345" replaced the part number wildcard in the filename provided in the auto-config file 206, and the string "abcd" replaced the system name wildcard in the filename provided in the auto-config file 206. If the telecommunications node 108a receives a response 220 that includes the unit-specific configuration file (e.g., "abcd.sca"), the telecommunications node 108a will use that received file, and no further configuration file requests need to be sent to the management device.

If the telecommunications node 108a does not receive the unit-specific configuration file in response to the request 218 (e.g., because the file does not exist on the management device 104), the auto-config file 206 instructs the telecommunications node to submit a request 222 for the base configuration file. The request 222 includes the derived path of the base configuration file (e.g., "12345/base config.sca"). In this example, the string "12345" replaced the part number wildcard in the filename provided in the auto-config file 206. The management device 104 responds to the request 222 by providing the base configuration file (e.g., "base config. sca"), and the telecommunications node 108a can be configured based on the base configuration file.

Over time, the configuration of the telecommunications node 108a may change relative to the configuration applied by the configuration files. When a change to the configuration is applied to the telecommunications node 108a, the telecommunications node 108a can upload an updated configuration file 226 to the management device 104, and the management device can store the updated configuration file 226 at the derived path of the unit-specific configuration file (e.g., "12345/abcd.sca"). As such, subsequent requests for the unit-specific configuration file will result in the updated configuration file 226 being provided. For example, assume that the telecommunications node 108a is replaced by a new telecommunications node. In this example, the new telecommunications node will proceed to request configuration files (and firmware) in the manner discussed above. When the new telecommunications node requests the unit-specific configuration file, the updated configuration file will be retrieved from the derived network path (e.g., "12345/abcd.sca") and used to configure the new telecommunications node.

Figure 3:
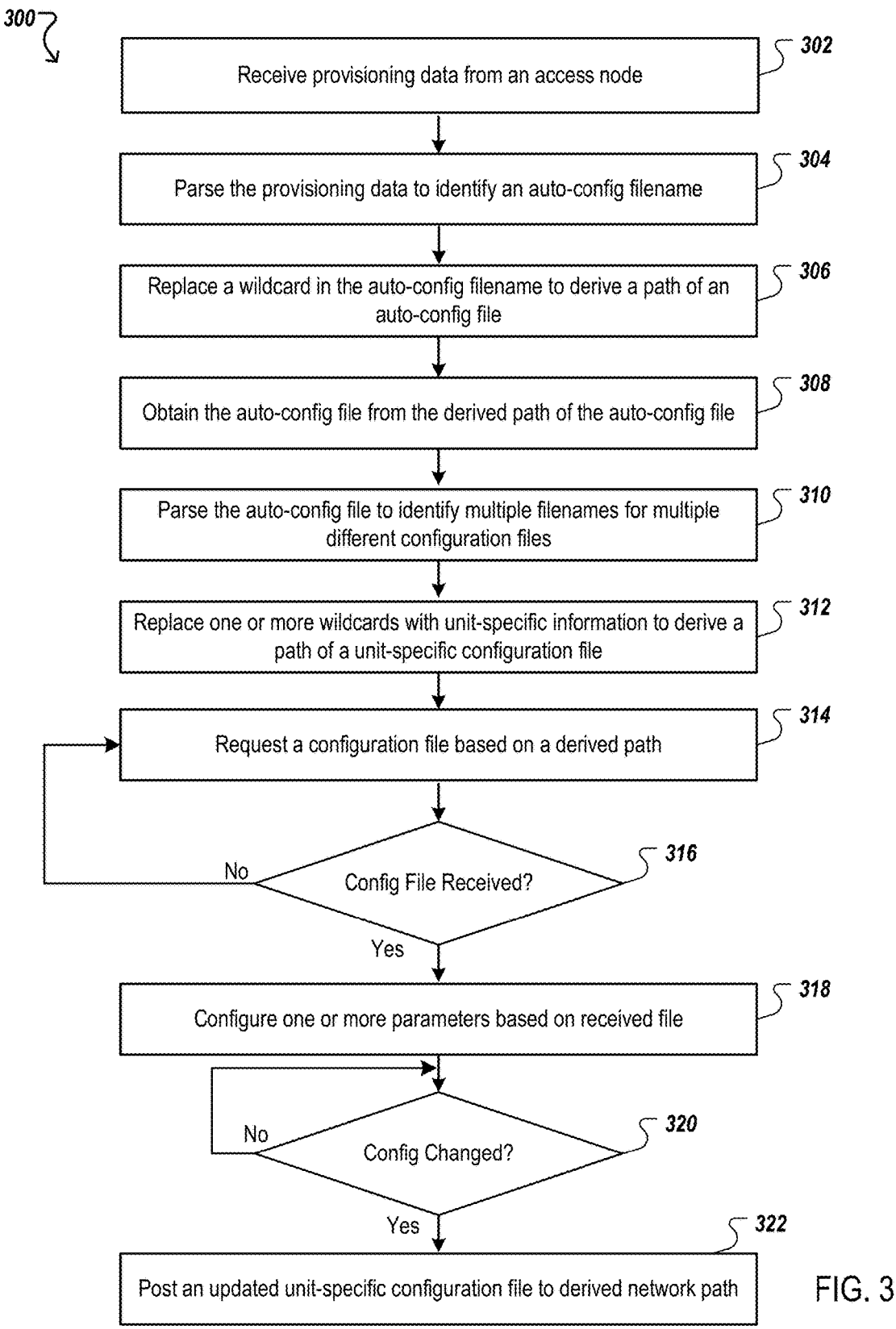
FIG. 3 is a flow chart of an example process for configuring a telecommunications node.

FIG. 3 is a flow chart of an example process 300 for configuring a telecommunications node. Operations of the process 300 can be performed, for example, by the telecommunications node 108a of FIG. 1. Operations of the process 300 can be implemented as machine readable instructions stored on a non-transitory computer readable medium, and execution of the instructions can cause a telecommunications node (e.g., the telecommunications node 108a) to perform operations of the example process 300.

Provisioning data are received from an access node (302). As discussed above with reference to FIGS. 1 and 2, the provisioning data can include information such as an IP address of the telecommunications node, a group name for the telecommunications node, an IP address of a file server from which the telecommunications node will request configuration and/or firmware files, and a filename for an auto-config file.

The provisioning data are parsed to identify the auto-config filename (304). In some implementations, the auto-config filename includes a wildcard that enables a same auto-config filename to be used for multiple different types of telecommunications nodes, while also enabling the retrieved auto-config file to be device type specific. For example, the auto-config filename in the provisioning data can be in the form of "$part_number$/auto-config." In this example, the string "$part_number$" is a wildcard that can be replaced so as to derive a path of the auto-config file for each different type of telecommunications node. As such, a generalized filename can be used across multiple different device types, while enabling a different auto-config file to be retrieved for each different device type.

A wildcard in the auto-config filename is replaced to derive a path of an auto-config file (306). In some implementations, the wildcard is replaced with device type information, such as a model number, to derive the path of the auto-config file for the telecommunications node. For example, a telecommunications node having a model number "12345" may replace the wildcard with "12345" to derive the path of the auto-config file (e.g., "12345/auto-config"). Similarly, a telecommunications node having the model number "99999" may replace the wildcard with "99999" to derive the path of the auto-config file (e.g., "99999/auto-config").

The auto-config file is obtained from the derived path of the auto-config file (308). In some implementations, the telecommunications node requests the auto-config file from a file server that hosts the auto-config file. The request can include the derived path of the auto-config file, which the file server uses to retrieve the auto-config file for the telecommunications node. In turn, the file server provides the auto-config file to the telecommunications node.

The auto-config file is parsed to identify multiple filenames for multiple different configuration files (310). In some implementations, the auto-config file is parsed to identify a filename of a temporary configuration file for the telecommunications node, a filename of a unit specific configuration file for the telecommunications node, and a filename of a base configuration that is used for multiple different telecommunications nodes.

One or more wildcards in the multiple filenames are replaced with unit-specific information to derive one or more paths of unit-specific configuration files (312). In some implementations, the wildcards are replaced with identifiers that specify one or more of a device type and/or device name. The identifier specifying the device type may be, for example, a model number (e.g., "12345") or part number of the telecommunications node, and the device name can be a name assigned to the device in the provisioning data (e.g., "unit_1"). In this example the telecommunications node can replace a part number wildcard (e.g., "$part_number$") with the model number or part number of the telecommunications node, and the telecommunications node can replace a system name wildcard (e.g., "$system_name$") with the device name.

As discussed above, the temporary configuration file, which, in some implementations, is used during troubleshooting, can have a filename such as "$part_number$/temporary/$system_name$.sca." Therefore, the derived path of the temporary configuration file may be "12345/temporary/unit_1.sca." Meanwhile, the filename for the unit-specific configuration file may be "$part_number$/$system_name$.sca," such that the telecommunications node will derive the path of the unit-specific configuration file to be "12345/unit_1.sca." Finally, the filename for a base configuration file, which can be applied to multiple different telecommunications nodes, may be "$part_number$/base-config," such that the path for the base configuration file will be derived as "12345/base-config."

A configuration file is requested based on one or more of the derived paths (314), and a determination is made whether a configuration file was received in response to the request (316). In some implementations, the telecommunications node requests the configuration file from a file server. The request can include, for example, the derived network path of the configuration file being requested. For example, when the temporary configuration file is being requested, the request can include the derived path of the temporary configuration file (e.g., "12345/temporary/unit_1.sca"). When the unit specific configuration file is being requested, the request can include the derived path of the unit-specific configuration file (e.g., "12345/unit_1.sca"). Meanwhile, when the base configuration file is being requested, the request can include the derived path of the base configuration file (e.g., "12345/base-config").

As discussed above, the auto-config file can instruct the telecommunications node to sequentially request configuration files in the following order temporary configuration file, unit-specific configuration file, base configuration file, until a configuration file is obtained, and configure one or more parameters of the telecommunications node using the first configuration file that is obtained. More specifically, as discussed above, the telecommunications node can first request the temporary configuration file, and await a response from the file server.

When a configuration file is not received in response to the request, another configuration file can be requested based on one of the derived paths (314). For example, when the telecommunications node determines that the temporary configuration file is not located at the derived path (e.g., based on a response from the file server indicating that the temporary configuration file is not located at the derived path or based on a lack of a response to the request by the file server), the telecommunications node can then submit a request for the unit-specific configuration file and await a response. When the telecommunications node determines that the unit-specific configuration file is not located at the derived path (e.g., based on a response from the file server indicating that the unit-specific configuration file is not located at the derived path), the telecommunications node can then submit a request for the base configuration file and await a response.

In some implementations, when a configuration file is received, one or more parameters of the telecommunications node are configured based on the received configuration file (318). The parameters of the telecommunications node that are configured can include applying services (e.g., telephony and/or data services) that are to be provided by the telecommunications node.

The configuration based on the received configuration file can be conditioned on the configuration file being different from a locally stored configuration file for the telecommunications node. For example, when the locally stored configuration file and the unit-specific configuration file match, there are no changes to be applied to the configuration of the telecommunications node. As such, the configuration of the telecommunications node does not need to be updated using the unit-specific configuration file. However, when the unit-specific configuration file does not match the locally stored configuration file, there are changes to be applied to the configuration of the telecommunications node. Therefore, the configuration of the telecommunications node will be updated based on the unit-specific configuration file.

A determination is made whether the configuration of the telecommunications node has changed (320). When a change to the configuration of the telecommunications node is detected (e.g., through a change in a configuration setting), an updated unit-specific configuration file is posted to the derived network path for the unit-specific configuration file (322). In some implementations, the change is detected due to a change to the configuration file used to configure the telecommunications node at startup.

In some implementations, when the configuration is determined to have changed, an updated unit-specific configuration file is posted to the derived network path of the unit-specific configuration file (322). In some implementations, the posting of the updated unit-specific configuration file includes transmitting the updated configuration file to the file server and storing the updated configuration file at the derived network path for the unit-specific configuration file (e.g., on a storage device of the file server). For example, the telecommunications node can generate one or more data packets that are addressed to the file server, and include, as payload data, the updated unit-specific configuration file. The generated data packet(s) can also specify the derived network path so that the file server can store the updated unit-specific configuration file at the path corresponding to the telecommunications node that transmitted the packet.

In some implementations, the posting of the updated unit-specific configuration file is scheduled at a time specified by the telecommunications node. The scheduling can be performed, for example, when the change to the configuration is detected. For example, prior to the telecommunications node transmitting any indication of the changed configuration to the file server (or another telecommunications node), the telecommunications node can schedule the posting of the unit-specific configuration file, and transmit the unit-specific configuration file to the file server as scheduled. This independent scheduling of the post by the telecommunications node provides a one-step posting technique (e.g., posting the unit-specific configuration file at the scheduled time) rather than requiring the telecommunications node to first inform the file server of the change, and then having the file server schedule the posting.

Figure 4:
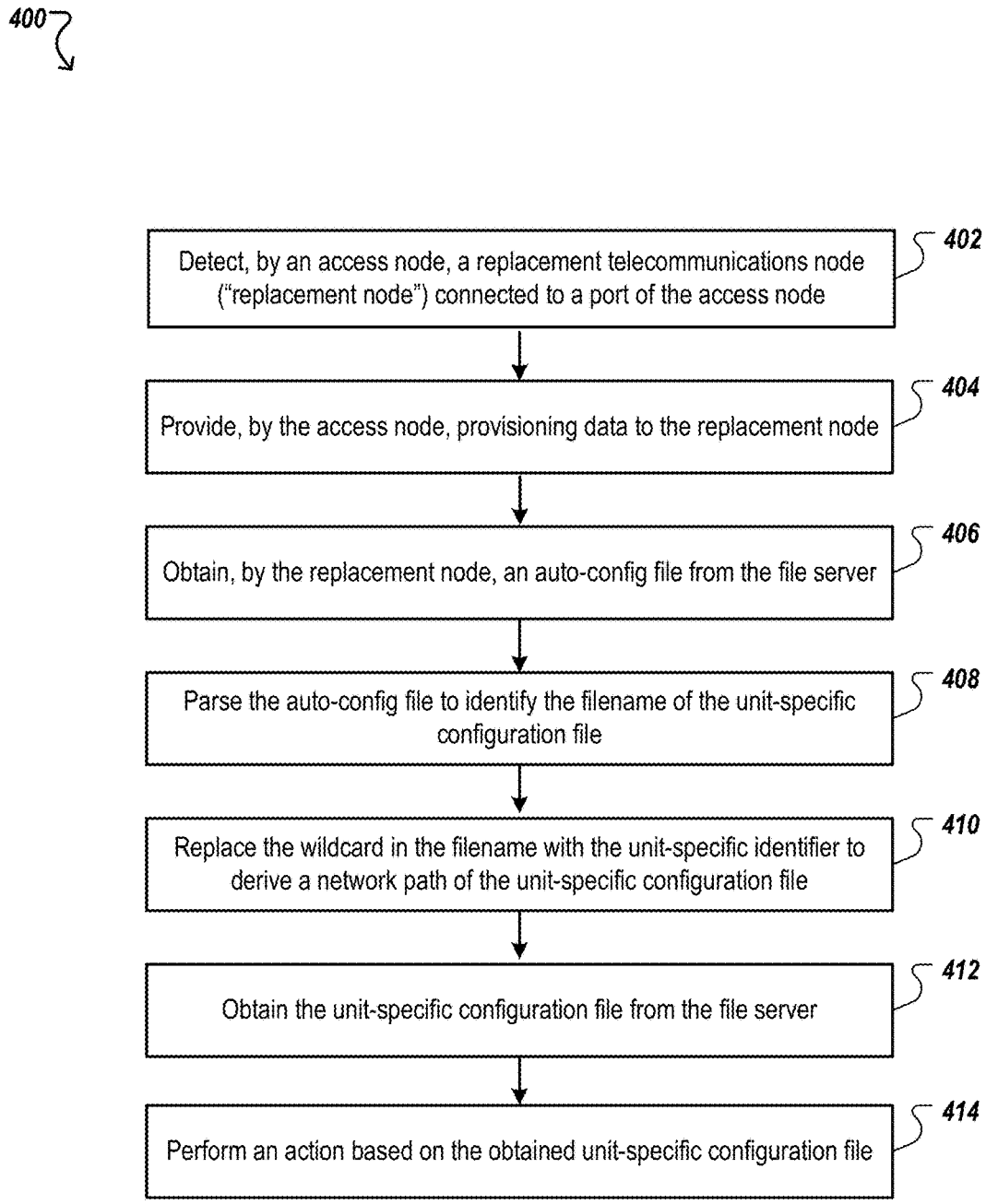
FIG. 4 is a flow chart of an example process for configuring a replacement telecommunications node.

FIG. 4 is a flow chart of an example process 400 for configuring a replacement telecommunications node ("replacement node"). The term replacement node refers to a telecommunications node that is installed at a same port to which a different telecommunications node was previously installed. For purposes of example, the following description assumes that the previously installed telecommunications node posted at least one updated unit-specific configuration file prior to being disconnected.

Operations of the process 400 can be performed, for example, by an access node and/or a telecommunications node. Operations of the process 400 can also be implemented as machine readable instructions stored on a non-transitory computer readable medium, and execution of the instructions can cause a telecommunications node to perform operations of the process 400.

Connection of a replacement node to a port of an access node is detected (402). For example, at power-up the replacement node can transmit a ping (e.g., data identifying the telecommunications node) to the access node. In response to the ping, the access node can identify the IP address assigned to the port over which the ping was received, along with other provisioning data for telecommunications nodes connected to the port (e.g., a name assigned to devices connected to that port), and provide the provisioning data to the replacement node (404).

The replacement node obtains an auto-config file from the file server (406). As discussed above, the provisioning data received from the access node can include the IP address of the file server and a filename for the auto-config file. The filename of the auto-config filename can include a wildcard that the replacement node replaces with unit-specific information (e.g., a product or model number) to request a model-specific auto-config file from the file server. The replacement node transmits the request to the file server, and in response, receives the auto-config file from the file server.

The replacement node parses the auto-config file to identify the filename of a unit-specific configuration file for the replacement node (408), and replaces the wildcard in the filename with a unit-specific identifier to derive the network path of the unit-specific configuration file (410). As discussed above, the filename of the unit-specific configuration file can include multiple different wildcards that the replacement node will replace with unit-specific information. For example, the replacement node can replace one wildcard with a model number (or part number) of the replacement node. The replacement node can also replace a second wildcard in the filename with the name assigned to the replacement node (e.g., from the provisioning data). In some implementations, the name assigned to the replacement node will be the same name that was assigned to the previously installed telecommunications node so that the path derived by replacing the wildcards in the filename will point to the location of an updated unit-specific configuration file that was posted to the file server by the previously installed communications node.

The replacement node obtains the unit-specific configuration file from the file server (412). For example, the replacement node can transmit a request to the file server (e.g., at the IP address identified in the provisioning data). The request can include the derived path of the unit-specific configuration file. Using the derived path of the unit-specific configuration file, the file server identifies the updated unit-specific configuration file that was last posted by the previously installed telecommunications node, and transmits the identified file to the replacement node.

The replacement node receives the unit-specific configuration file, and takes an action based on that unit-specific configuration file (414). In some implementations, the action taken by the replacement node will be based on whether the configuration specified by the received unit-specific configuration file matches a stored configuration file. For example, the replacement node can compare the received unit specific configuration file to a locally stored configuration file (e.g., assuming that the replacement unit had previously been configured for operation) to determine whether there is match (e.g., they specify the same configuration). If a match exists, the replacement node can discard the unit-specific configuration file, and simply use the locally stored configuration file. When the replacement node determines that a match does not exist, the replacement node can replace the stored configuration file with the unit-specific configuration file so that the replacement node will be configured in the same way as the previously installed telecommunications node. Note that any installed telecommunications node (not just a replacement node) can perform a similar configuration file comparison and take action as described above.

Figure 5:
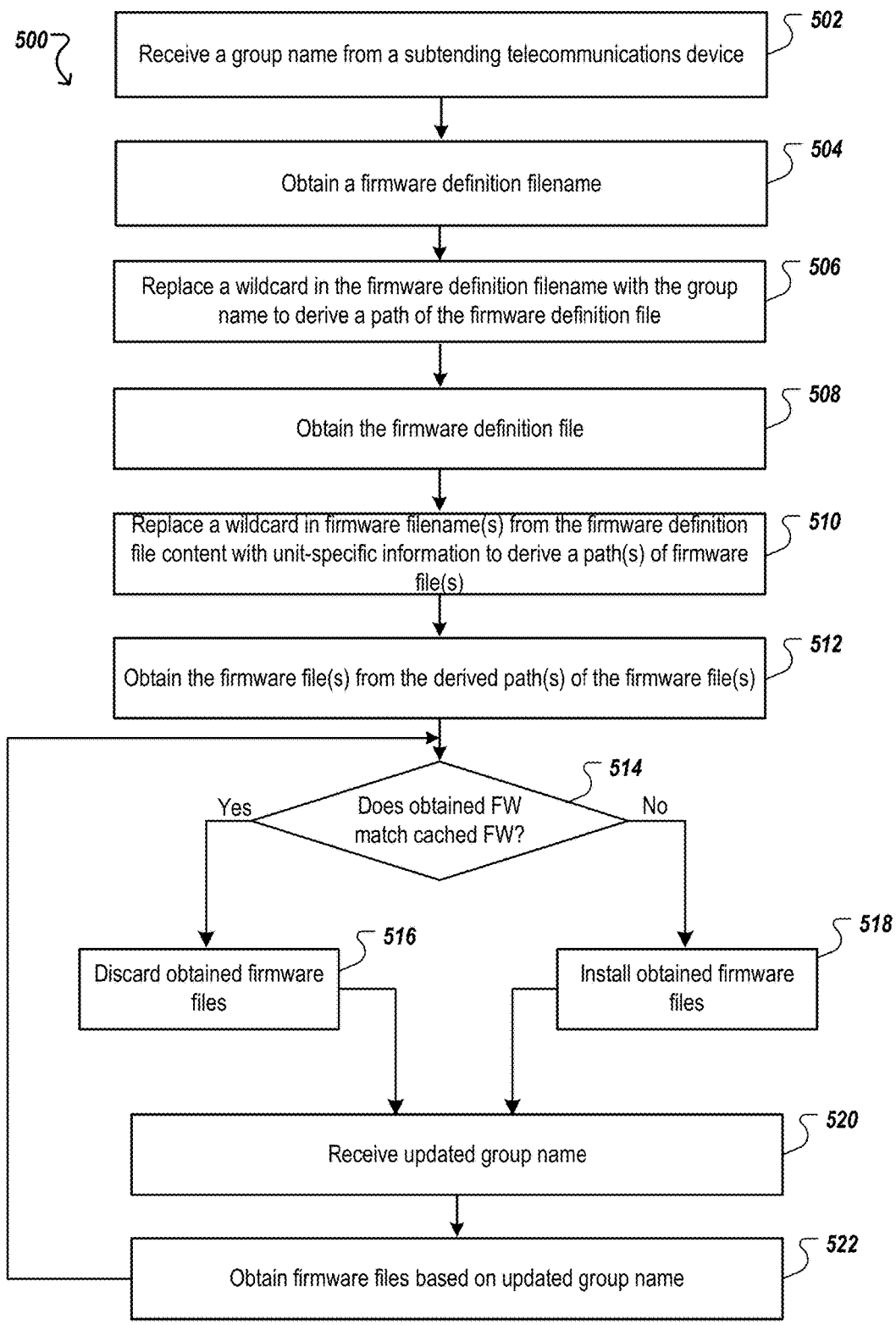
FIG. 5 is a flow chart of an example process for managing firmware in a telecommunications node.

FIG. 5 is a flow chart of an example process 500 for managing firmware in a telecommunications node. Operations of the process 500 can be performed, for example, by the telecommunications node 108a of FIG. 1. Operations of the process 500 can also be implemented as machine readable instructions stored on a non-transitory computer readable medium, and execution of the instructions can cause a telecommunications node to perform operations of the process 500.

A group name is received from a subtending telecommunications node (502). As discussed above, the group name can be included in the provisioning data that are provided to the telecommunications node by the access node. In some implementations, the group name initially assigned to the telecommunications node can be a default name that can be used for multiple different types (e.g., different models) of telecommunications nodes. For example, assume that the initial group name provided by the subtending telecommunications node (e.g., the access node) is "default."

A firmware definition filename is obtained by the telecommunications node (504). In some implementations, the firmware definition filename is obtained from the auto-config file obtained as discussed above. For example, the auto-config file can include data specifying the filename of the firmware definition filename. In some implementations, the firmware definition filename includes a wildcard so that a same firmware definition filename can be used for various different types of telecommunications nodes. For example, using a filename that includes a wildcard enables the telecommunications node to use the filename to derive a customized path for the firmware definition files that are to be used by that specific telecommunications node. In particular, the path of the firmware definition files for a specific telecommunications node can be derived based on the group name assigned to the telecommunications node.

A wildcard in the firmware definition filename is replaced with the group name to derive a path of the firmware definition file (506). In some implementations, the wildcard in the firmware definition file is a group name wildcard. For example, assume that the firmware definition filename is "definition_files/$group_name$." In this example, the telecommunications node can replace the wildcard "$group_name$" with the group name that was assigned to the telecommunications node (e.g., by the provisioning data). If the initial group name assigned to the telecommunications node is "default," the resulting path derived by replacing the wildcard with the group name will be "definition_files/default."

The firmware definition file is obtained from the derived path of the firmware definition file (508). In some implementations, the telecommunications node transmits a request for the firmware definition file to the file server. For example, using the IP address of the file server (e.g., as provided in the provisioning data) and the derived path of the firmware definition file, the telecommunications node can generate one or more data packets that are transmitted to the file server and request that the firmware definition file at the derived path be provided to the telecommunications node. In response to receiving the request, the file server will identify the file located at the derived path, as specified in the request, and transmit one or more data packets to the requesting telecommunications node (e.g., at an IP address of the requesting telecommunications node).

A wildcard in a firmware filename (or filenames) obtained by parsing the firmware definition file content is replaced with unit-specific information to derive path(s) of firmware file(s) (510). In some implementations, the firmware definition file specifies a firmware filename that the telecommunication device uses to derive a path of unit-specific firmware files that are to be installed on the telecommunications node. The firmware filename can include a wildcard that enables the same firmware filename to be provided to multiple different types of telecommunications nodes, while also enabling the different types of telecommunications nodes to obtain different firmware files. In a particular example, the firmware definition file can include a firmware filename in the form of "system_releases/ $part_number$App_H02_02.bin," or a similar form. This firmware filename includes the $part_number$ wildcard, which the telecommunications node can replace with its model number (or part number) to derive the network location of the firmware file for the telecommunication nodes. As should be appreciated, different models of telecommunications nodes will populate the firmware filename with different model numbers (or part numbers), such that different network paths will be derived for the different models of telecommunications nodes.

The firmware files are obtained from the derived path(s) of the firmware files (512). In some implementations, the telecommunications node transmits a request to the file server for the firmware files. For example, using the IP address of the file server and the derived path(s) of the firmware file(s), the telecommunications node can generate one or more data packets that are addressed to the file server and request that the file server respond with firmware file(s) that are located at the derived path(s). In response to receiving the request, the file server can use the derived path to identify the files stored at the derived path(s), and respond to the request by providing one or more packets that include the files stored at the derived path(s).

A determination is made whether the obtained firmware matches cached firmware (514). As the firmware files are being received by the telecommunications node, the telecommunications node can begin decoding the received firmware files and comparing the decoded files to locally stored (e.g., cached) firmware that is installed on the telecommunications node. When the telecommunications node has decoded enough of the received firmware files to determine that the received firmware is the same version as the locally stored firmware, the telecommunications node can cancel the transfer of firmware files by the file server, discard the obtained firmware files, and continue using the locally stored firmware (516). When the telecommunications node determines, based on the comparison, that the received firmware is different than the locally stored firmware, the telecommunications node can complete the transfer of the firmware files, and install the obtained firmware files (e.g., in cache) (518). The installation of the obtained firmware files results in the locally stored firmware being replaced by the obtained firmware files.

In some implementations, the technique selected for installing the obtained firmware files is based on an amount of memory available at the telecommunications node. For example, when the amount of memory available at the telecommunications node is sufficient to store obtained firmware files while also maintaining any previously installed firmware files, the obtained firmware files can be stored prior to (or without) deleting the previously installed firmware files. In situations where the amount of memory is not sufficient to store both the previously installed firmware files and the obtained firmware files, the previously installed firmware files can be deleted prior to storing (or installing) the obtained firmware files.

At some point, an administrator of the telecommunications network may want to update the firmware being used by a group of telecommunications nodes (e.g., nodes servicing a particular geographic area or customer). In this situation, the administrator can store the new firmware files at a given location on the file server (e.g., "system_releases/ 12345_App_H03_01.bin" and "system_releases/ 99999_App_H03_01.bin"). The administrator can also create a new firmware definition file corresponding to the new firmware files, which can be used to direct the group of telecommunications nodes to the location of the updated firmware files. For example, the administrator can create and store the new firmware definition file at the following filename "definition_files/App_H03_01," and the content of this firmware definition file stored at this location can include the following firmware filename "system_releases/ $part_number$_$group_name$.bin." Formatting the firmware filenames in this manner will direct telecommunications nodes having the model number "12345" and the group name "App_H03_01" to the location of the updated firmware filenames (e.g., "system_releases/ 12345_App_H03_01.bin"). As can be appreciated, this filename format also enables the administrator to be able to use the same filename to update the firmware across multiple different types of telecommunications nodes, even where the different telecommunications nodes may require different firmware files.

For example, assume that a different telecommunications node (e.g., model number "99999") requires different firmware than the telecommunications node having the model number "12345." Further assume that there is an update that the administrator wants to deploy on all telecommunications nodes that are members of a given Ethernet First Mile Group, which includes telecommunications nodes having the model number "99999" as well as telecommunications nodes having the model number "12345." In this example, the filename above will direct the telecommunications nodes having the model number "99999" and the group name "App_H03_01" to the path "system_releases/ 99999_App_H03_01.bin." As such, the firmware obtained by these telecommunications nodes can differ from that obtained by telecommunications nodes having the model number "12345" (e.g., the firmware obtained from "system_ releases/12345_App_H03_01.bin").

To initiate the firmware update, the file server and/or access node can transmit an updated group name to one or more telecommunications nodes. In some implementations, the access node is prompted to provide updated provisioning data to the telecommunications nodes when the updated group name is received from the management device (e.g., via SNMP). For example, when the access node receives the updated group name, the access node sends an updated set of provisioning data to all affected telecommunications nodes (e.g., as identified by IP addresses by the file server). Continuing with the example above, the group name that will be applied to the telecommunications nodes is "App_H03_01."

The telecommunications nodes receive the updated provisioning data, which includes the updated group name (520). In some implementations, receipt of the updated provisioning data triggers the telecommunications node to again retrieve and parse/process the auto-config file as discussed above, to obtain the firmware definition file. In this example, the group name has been updated to "App_H03_01" in the provisioning data. Therefore, when the auto-config file is parsed, and the wildcard in the firmware definition filename is replaced with the updated group name "App_H03_01" to derive the filename "definition_files/App_H03_01" for the firmware definition file. In turn, firmware files are obtained by the telecommunications node based on the updated group name (522).

For example, when the telecommunications node obtains the firmware definition file from the filename "definition_files/App_H03_01," the telecommunications node can parse the firmware definition file to identify a filename of the firmware files. Continuing with the example, above assume that the firmware filename specified in the content of the firmware definition file is "system_releases/$part_number-$_$group_name$.bin." In this example, each telecommunications node in the group "App_H03_01" will replace the "$part_number$" wildcard with the model number (or part number) of that telecommunications node and will replace the "$group_name$" wildcard with the group name "App_H03_01." As such, telecommunications nodes having the model number "99999" will derive a firmware file path of "system_releases/99999_App_H03_01.bin," while telecommunications nodes having the model number "12345" will derive a firmware file path of "system_releases/12345_App_H03_01.bin." In turn, each telecommunications node will use the derived firmware file paths to obtain the updated firmware stored at these respective locations.

A determination is again made whether the obtained firmware files match the cached firmware files (514). Each telecommunications node that obtains the updated firmware files can determine whether the obtained firmware files match the locally stored firmware files, and again take action (e.g., manage the firmware installed on the telecommunications node) based on the determination, as discussed above.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A telecommunications device comprising:
   a transceiver that couples the telecommunications device to a line card of a subtending device that provides access to a carrier network;
   a memory device; and
   a data processor coupled to the transceiver and the memory device, wherein the data processor is configured to perform operations comprising:
      receiving, from the subtending device, a group name for the telecommunications device;
      obtaining a firmware filename, wherein the firmware filename includes a wildcard;
      replacing the wildcard in the firmware filename with the group name to derive a first network path of firmware files for the telecommunications device;
      installing first firmware files from the first network path;
      receiving, from the subtending device, an updated group name for the telecommunications device;
      replacing the wildcard in the firmware filename with the updated group name to derive an updated network path of firmware files for the telecommunications device;
      obtaining second firmware files from the updated path;
      managing firmware installed on the telecommunications device based on the first firmware files and the second firmware files.

2. The telecommunications device of claim 1, wherein managing firmware installed on the telecommunications device comprises:
   comparing the second firmware files to the first firmware files; and
   taking an action based on the comparison.

3. The telecommunications device of claim 2, wherein taking an action based on the comparison comprises discarding the second firmware files when the second firmware files match the first firmware files.

4. The telecommunications device of claim 2, wherein taking an action based on the comparison comprises replacing the first firmware files with the second firmware files when the second firmware files differ from the first firmware files.

5. The telecommunications device of claim 1, wherein the data processor is configured to perform operations comprising:
   receiving an auto-config filename of an auto-config file for the telecommunications device;
   replacing a wildcard value of the auto-config filename to derive a path of the auto-config file for the telecommunications device;
   obtaining the auto-config file from the derived path of the auto-config file;
   parsing the auto-config file to identify a definition filename for firmware definition files; and
   replacing a wildcard value in the definition filename with the group name to derive a network path of a firmware definition file, wherein:
      obtaining the firmware filename comprises obtaining the firmware filename from the firmware definition file obtained from the derived network path.

6. The telecommunications device of claim 1, wherein the data processor is configured to perform operations further comprising:
   receiving, from the subtending device, a new group name that is included in a filename of an updated firmware version.

7. A system comprising:
   a file server;
   a subtending device coupled to the file server, wherein the subtending device includes one or more line cards that connect one or more telecommunications devices to a network; and
   a telecommunications device coupled to the subtending device, wherein the telecommunications device is configured to manage firmware installed at the telecommunications device by performing operations including:
      receiving, from the subtending device, a group name for the telecommunications device;
      obtaining a firmware filename, wherein the firmware filename includes a wildcard;
      replacing the wildcard in the firmware filename with the group name to derive a first network path of firmware files for the telecommunications device;
      installing first firmware files obtained from the first network path;
      receiving, from the subtending device, an updated group name for the telecommunications device;
      replacing the wildcard in the firmware filename with the updated group name to derive an updated network path of firmware files for the telecommunications device;
      obtaining second firmware files from the updated path;
      managing firmware installed on the telecommunications device based on the first firmware files and the second firmware files.

8. The system of claim 7, wherein managing firmware installed on the telecommunications device comprises:
   comparing the second firmware files to the first firmware files; and
   taking an action based on the comparison.

9. The system of claim 8, wherein taking an action based on the comparison comprises discarding the second firmware files when the second firmware files match the first firmware files.

10. The system of claim 9, wherein taking an action based on the comparison comprises replacing the first firmware files with the second firmware files when the second firmware files differ from the first firmware files.

11. The system of claim 8, wherein the telecommunications device is configured to perform operations further comprising:
   receiving an auto-config filename of an auto-config file for the telecommunications device;
   replacing a wildcard value of the auto-config filename to derive a path of the auto-config file for the telecommunications device;
   obtaining the auto-config file from the derived path of the auto-config file;
   parsing the auto-config file to identify a definition filename for firmware definition files; and
   replacing a wildcard value in the definition filename with the group name to derive a network path of a firmware definition file, wherein:
      obtaining the firmware filename comprises obtaining the firmware filename from the firmware definition file obtained from the derived network path.

12. The system of claim 8, wherein the subtending device is configured to perform operations comprising:
   receiving, by the subtending device, a new group name that is included in a filename of an updated firmware version; and
   transmitting, by the subtending device, the new group name to the telecommunications device.

13. A method of managing device firmware, comprising:
   receiving, by a telecommunications device and from a subtending device, a group name for the telecommunications device;
   obtaining, by the telecommunications device, a firmware filename, wherein the firmware filename includes a wildcard;
   replacing, by the telecommunications device, the wildcard in the firmware filename with the group name to derive a first network path of firmware files for the telecommunications device;
   installing, by the telecommunications device, first firmware files from the first network path;
   receiving, by the telecommunications device and from the subtending device, an updated group name for the telecommunications device;
   replacing, by the telecommunications device, the wildcard in the firmware filename with the updated group name to derive an updated network path of firmware files for the telecommunications device;
   obtaining, by the telecommunications device, second firmware files from the updated path;
   managing, by the telecommunications device, firmware installed on the telecommunications device based on the first firmware files and the second firmware files.

14. The method of claim 13, wherein managing firmware installed on the telecommunications device comprises:
   comparing the second firmware files to the first firmware files; and
   taking an action based on the comparison.

15. The method of claim 14, wherein taking an action based on the comparison comprises discarding the second firmware files when the second firmware files match the first firmware files.

16. The method of claim 14, wherein taking an action based on the comparison comprises replacing the first firmware files with the second firmware files when the second firmware files differ from the first firmware files.

17. The method of claim 13, further comprising:
   receiving, by the telecommunications device, an auto-config filename of an auto-config file for the telecommunications device;

replacing, by the telecommunications device, a wildcard value of the auto-config filename to derive a path of the auto-config file for the telecommunications device;

obtaining, by the telecommunications device, the auto-config file from the derived path of the auto-config file;

parsing, by the telecommunications device, the auto-config file to identify a definition filename for firmware definition files; and replacing, by the telecommunications device, a wildcard value in the definition filename with the group name to derive a network path of a firmware definition file, wherein:

obtaining the firmware filename comprises obtaining the firmware filename from the firmware definition file obtained from the derived network path.

18. The method of claim 13, further comprising:

receiving, by the subtending device, a new group name that is included in a filename of an updated firmware version; and transmitting, by the subtending device, the new group name to the telecommunications device.

19. The method of claim 18, further comprising obtaining, by the telecommunications device, updated firmware based on the new group name.

\* \* \* \* \*